US008746796B2

(12) United States Patent
Wei

(10) Patent No.: US 8,746,796 B2
(45) Date of Patent: Jun. 10, 2014

(54) ANTI-BACKDRIVE FOR CONTINUOUS DISC RECLINER

(75) Inventor: Xiao Jun Wei, Canton, MI (US)

(73) Assignee: Magna Seating Inc., Aurora, Ontario (CA)

( * ) Notice: Subject to any disclaimer, the term of this patent is extended or adjusted under 35 U.S.C. 154(b) by 298 days.

(21) Appl. No.: 13/255,252

(22) PCT Filed: Mar. 12, 2010

(86) PCT No.: PCT/CA2010/000369
§ 371 (c)(1),
(2), (4) Date: Sep. 8, 2011

(87) PCT Pub. No.: WO2010/102413
PCT Pub. Date: Sep. 16, 2010

(65) Prior Publication Data
US 2012/0001471 A1 Jan. 5, 2012

Related U.S. Application Data

(60) Provisional application No. 61/159,571, filed on Mar. 12, 2009.

(51) Int. Cl.
*B60N 2/235* (2006.01)
(52) U.S. Cl.
USPC .......................................................... 297/362
(58) Field of Classification Search
USPC ................................................. 297/362, 374
See application file for complete search history.

(56) References Cited

U.S. PATENT DOCUMENTS

| 5,871,414 | A | 2/1999 | Voss et al. |
| 7,278,689 | B2 | 10/2007 | Guillouet |
| 7,455,361 | B2 | 11/2008 | Stemmer et al. |
| 2005/0231017 | A1* | 10/2005 | Lange .......................... 297/374 |
| 2007/0170764 | A1 | 7/2007 | Thiel et al. |
| 2008/0136242 | A1 | 6/2008 | Stemmer et al. |
| 2009/0315380 | A1* | 12/2009 | Nae ............................... 297/374 |
| 2010/0013288 | A1* | 1/2010 | Mitsuhashi .................... 297/362 |
| 2010/0056317 | A1* | 3/2010 | Kirubaharan ................. 475/175 |

FOREIGN PATENT DOCUMENTS

| FR | 2902375 A1 | 2/2007 |
| WO | 2008104334 A1 | 9/2008 |

* cited by examiner

*Primary Examiner* — Milton Nelson, Jr.
(74) *Attorney, Agent, or Firm* — Miller Canfield

(57) ABSTRACT

A disc recliner includes a fixed plate having a plurality of outer teeth and a movable plate having a plurality of inner teeth meshingly engageable with the outer teeth to allow rolling movement of the movable plate relative to the fixed plate. A pair of wedges defining an eccentric is rotatably mounted between the fixed and movable plates and rotation of the wedges causes the rolling movement of the movable plate. An anchor is disposed between the wedges for rotation therewith. A lock plate is coupled to the anchor and is movable between a locked position engaged with the fixed plate to prevent rotation of the wedges and an unlocked position disengaged with the fixed plate to permit rotation of the wedges. A cam actuates the lock plate from the locked position to the unlocked position and rotates the wedges thereby causing the rolling movement of the movable plate.

14 Claims, 11 Drawing Sheets

ANTI-BACKDRIVE FOR CONTINUOUS DISC RECLINER

CROSS-REFERENCE TO RELATED APPLICATIONS

This application is a national phase application and claims priority to and all the benefits of, under 35 USC 371, of PCT/CA2010/000369, filed on Mar. 12, 2010, which in turn claims the priority of U.S. Provisional Application No. 61/159,571, filed on Mar. 12, 2009 and entitled "Anti-Backdrive for Continuous Disc Recliner". All applications are incorporated herein by reference in their entireties.

BACKGROUND OF THE INVENTION

1. Field of the Invention

The invention relates to a disc recliner for an automotive vehicle seat that allows pivotal adjustment of a seat back relative to a seat cushion. More particularly, the invention relates to a continuous disc recliner having an anti-backdrive mechanism.

2. Description of Related Art

Automotive vehicles include seat assemblies for supporting a seated occupant in the vehicle. Each seat assembly includes a generally horizontal seat cushion and a generally vertical seat back operatively coupled to the seat cushion by a recliner assembly. The recliner assembly allows for adjustment of the seat back relative to the seat cushion between a plurality of reclined seating positions.

One well known type of recliner assembly includes a pair of continuous disc recliners to operatively couple the seat back to the seat cushion. Generally, a typical prior art continuous disc recliner includes a fixed plate secured to the seat cushion and a movable plate secured to the seat back and rotatably coupled to the fixed plate. The fixed plate is formed to include a toothed outer profile and the movable plate is formed to include a toothed inner profile. The tooth count of the toothed outer profile has at least one less tooth than the tooth count of the toothed inner profile. A drive mechanism is disposed between the movable plate and the fixed plate and is operable for urging the movable plate to rotate relative to the fixed plate. The drive mechanism includes a cam and a pair of wedges that define an eccentric, which presses the toothed outer profile and the toothed inner profile into each other at an engagement point defined by the eccentricity. When the cam is rotated in a first direction, the wedges are driven in the first direction causing the direction of the eccentricity to shift and therefore shifting the engagement point of the toothed outer profile in the toothed inner profile. The shifting of the engagement point manifests itself as a wobbling rotational movement of the movable plate in the first direction, thereby reclining the seat back. When the cam is rotated in a second direction, the wedges are driven in the second direction causing the direction of the eccentricity to shift and therefore shifting the engagement point of the toothed outer profile in the toothed inner profile. The shifting of the engagement point manifests itself as a wobbling rotational movement of the movable plate in the second direction, thereby inclining the seat back. The seat back is maintained in a desired reclined seating position due to friction between the toothed outer profile and the toothed inner profile at the engagement point and due to friction between the wedges and the fixed and movable plates.

One drawback of this type of continuous disc recliner is back-driving. Back-driving is unwanted operation of the disc recliner in response to an external load placed against the seat back. In other words, when an occupant is seated on the seat assembly the external load against the seat back may overcome the friction that maintains the seat back in the desired reclined seating position. In such instances, the external load overcomes the friction and urges the movable plate in the first direction, thereby reclining the seat back.

It is desirable, therefore, to provide a continuous disc recliner with an anti-backdrive mechanism that prevents unwanted back-driving of the continuous disc recliner to maintain a seat back in a desired reclined seating position.

SUMMARY OF THE INVENTION

According to one aspect of the invention, a disc recliner for an automotive vehicle seat is provided for allowing pivotal movement of a seat back relative to a seat cushion between a plurality of reclined seating positions. The disc recliner includes a fixed plate and a movable plate. The fixed plate is adapted to be mounted to the seat cushion and includes a plurality of outer teeth and a first plurality of inner teeth. The movable plate is adapted to be mounted to the seat back and includes a second plurality of inner teeth meshingly engageable with the plurality of outer teeth on the fixed plate to allow rolling movement of the movable plate relative to the fixed plate. A pair of wedges is rotatably mounted between the fixed and movable plates. The pair of wedges define an eccentric and rotation of the pair of wedges causes the rolling movement of the movable plate relative to the fixed plate. A lock anchor is disposed between the pair of wedges for rotation therewith. A lock plate is coupled to the lock anchor and is movable between a locked position and an unlocked position. In the locked position, the lock plate is engaged with the first plurality of inner teeth on the fixed plate to block movement of the lock anchor, which thereby prevents rotation of the pair of wedges. In the unlocked position, the lock plate is disengaged with the first plurality of inner teeth on the fixed plate to allow movement of the lock anchor, which thereby permits rotation of the pair of wedges. A cam is provided for rotatably driving the pair of wedges and actuating the lock plate between the locked and unlocked positions. Rotation of the cam actuates the lock plate from the locked position to the unlocked position and rotates the pair of wedges thereby causing the rolling movement of the movable plate relative to the fixed plate.

BRIEF DESCRIPTION OF THE DRAWINGS

Other advantages of the present invention will be readily appreciated as the same becomes better understood by reference to the following detailed description when considered in connection with the accompanying drawings, wherein.

DETAILED DESCRIPTION OF THE PREFERRED EMBODIMENT

Figure 1:
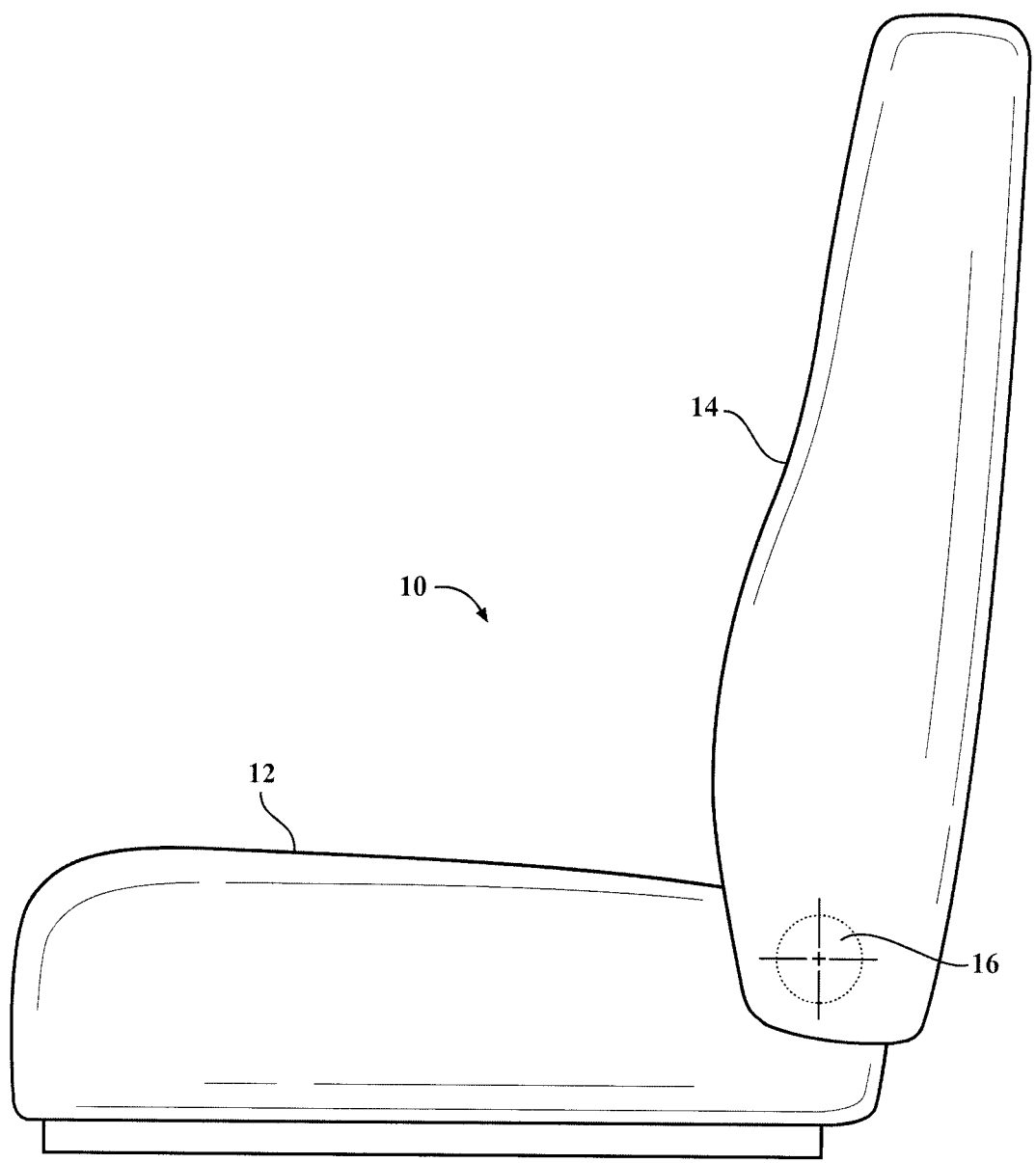
FIG. 1 is a side view of a seat assembly with a continuous disc recliner having an anti-backdrive mechanism according to one embodiment of the invention.

Referring to the Figures, FIG. 1 discloses a seat assembly 10 for use in an automotive vehicle. The seat assembly 10 includes a generally horizontal seat cushion 12 and a generally vertical seat back 14 for supporting an occupant on the seat assembly 10. The construction of each of the seat cushion 12 and seat back 14 includes a rigid frame structure for supporting a contoured foam pad encased by a trim cover as known to one skilled in the art. The seat back 14 is operatively coupled to the seat cushion 12 by a pair of synchronized continuous disc recliners 16 (one shown). The continuous disc recliners 16 allow for pivotal or angular adjustment of the seat back 14 between a plurality of reclined seating positions, one of which is shown in FIG. 1.

Referring to FIGS. 2 through 6, one of the continuous disc recliners 16 of the current invention is illustrated in detail. The disc recliner 16 includes a fixed plate 20 adapted to be secured to the seat cushion 12 and a movable plate 22 adapted to be secured to the seat back 14 and rotatably coupled to the fixed plate 20. The fixed plate 20 and the movable plate 22 are held together by a retaining ring 21 in a manner well known in the art such that the movable plate 22 can rotate relative to the fixed plate 20. The disc recliner 16 also includes a dust cover 23 coupled to the fixed plate 20 by the retaining ring 21 to enclose internal elements of the disc recliner 16 which are described in detail below.

The fixed plate 20 is circular, generally ring-shaped, and includes a first central bore 24 extending axially therethrough. A bearing sleeve 26 is pressed into the first central bore 24 in a rotationally fixed manner and defines a first bearing surface 28. The fixed plate 20 includes a first side 30 that is adapted to be secured to the seat cushion 12 and an opposite second side 32. An outer surface 34 extending circumferentially around the fixed plate 20 includes a plurality of outer teeth 36 disposed therearound.

The movable plate 22 is circular, generally cup-shaped, and includes an integrally formed collar 38 protruding axially toward the fixed plate 20 and having a second central bore 40 extending axially therethrough. An outer surface of the collar 38 defines a second bearing surface 42. The movable plate 22 includes a first side 44 that is adapted to be secured to the seat back 14 and an opposite second side 46 that is disposed adjacent the second side 32 of the fixed plate 20. An axially extending flange 48 is disposed circumferentially around the movable plate 22 and defines an inner surface 50 having a plurality of inner teeth 52 disposed therearound. The outer teeth 36 on the fixed plate 20 meshingly cooperate with the inner teeth 52 on the movable plate 22. The tooth count of the outer teeth 36 has at least one less tooth than the tooth count of the inner teeth 52. The corresponding difference in the number of outer teeth 36 and inner teeth 52 permits a rolling movement of the movable plate 22 about the fixed plate 20.

Figure 2:
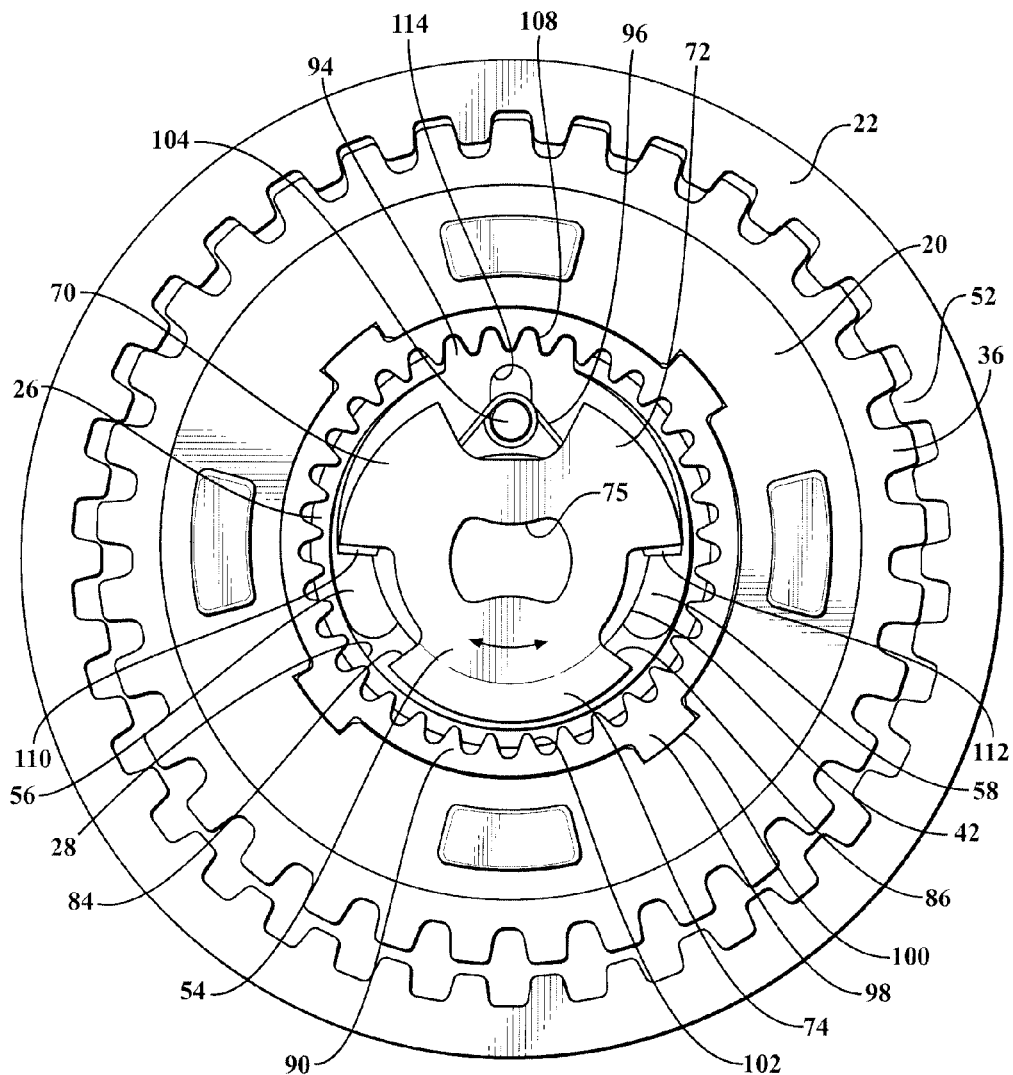
FIG. 2 is a side view of the continuous disc recliner.
Figure 3:
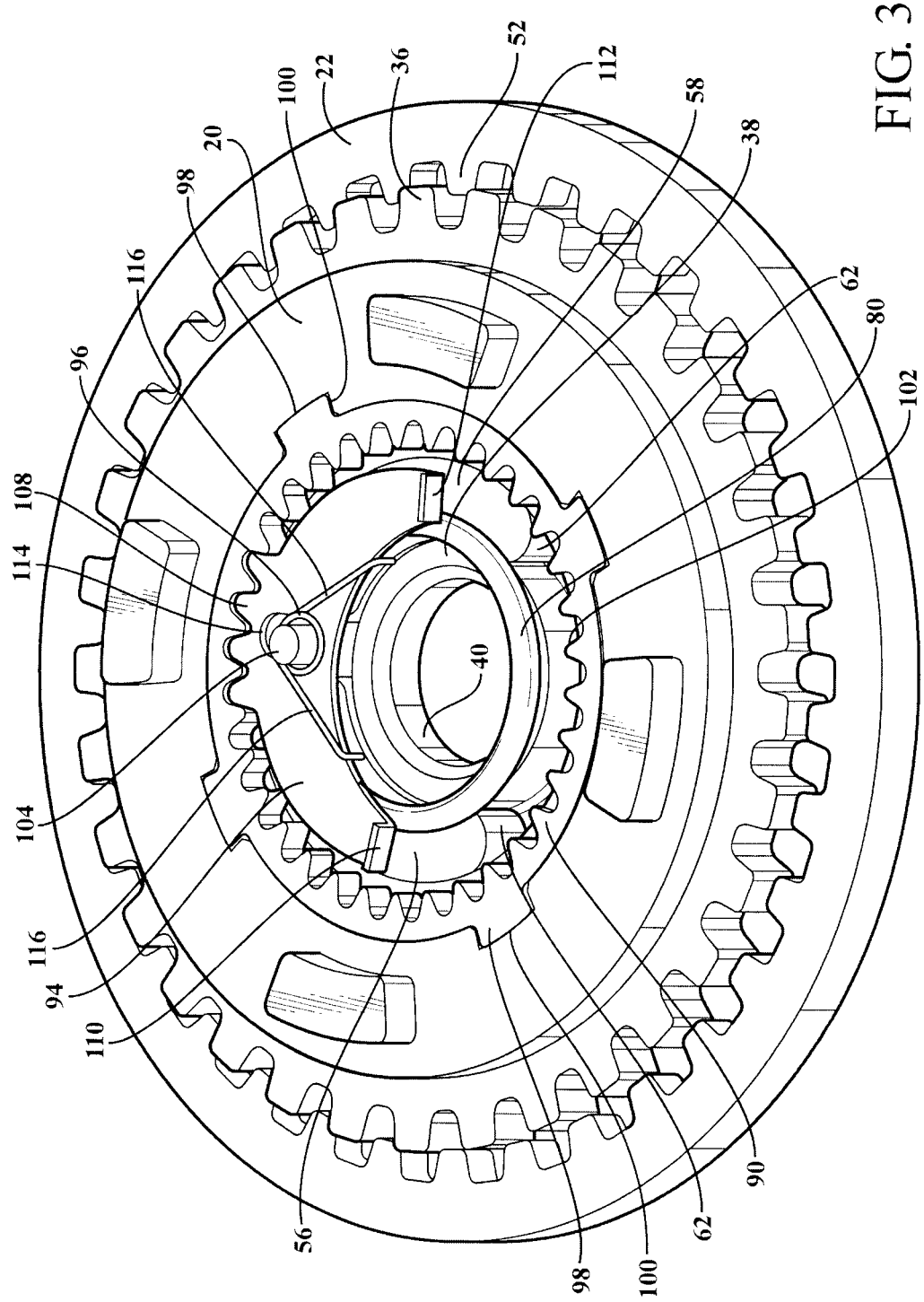
FIG. 3 is a perspective view of the continuous disc recliner with a cam removed.
Figure 4:
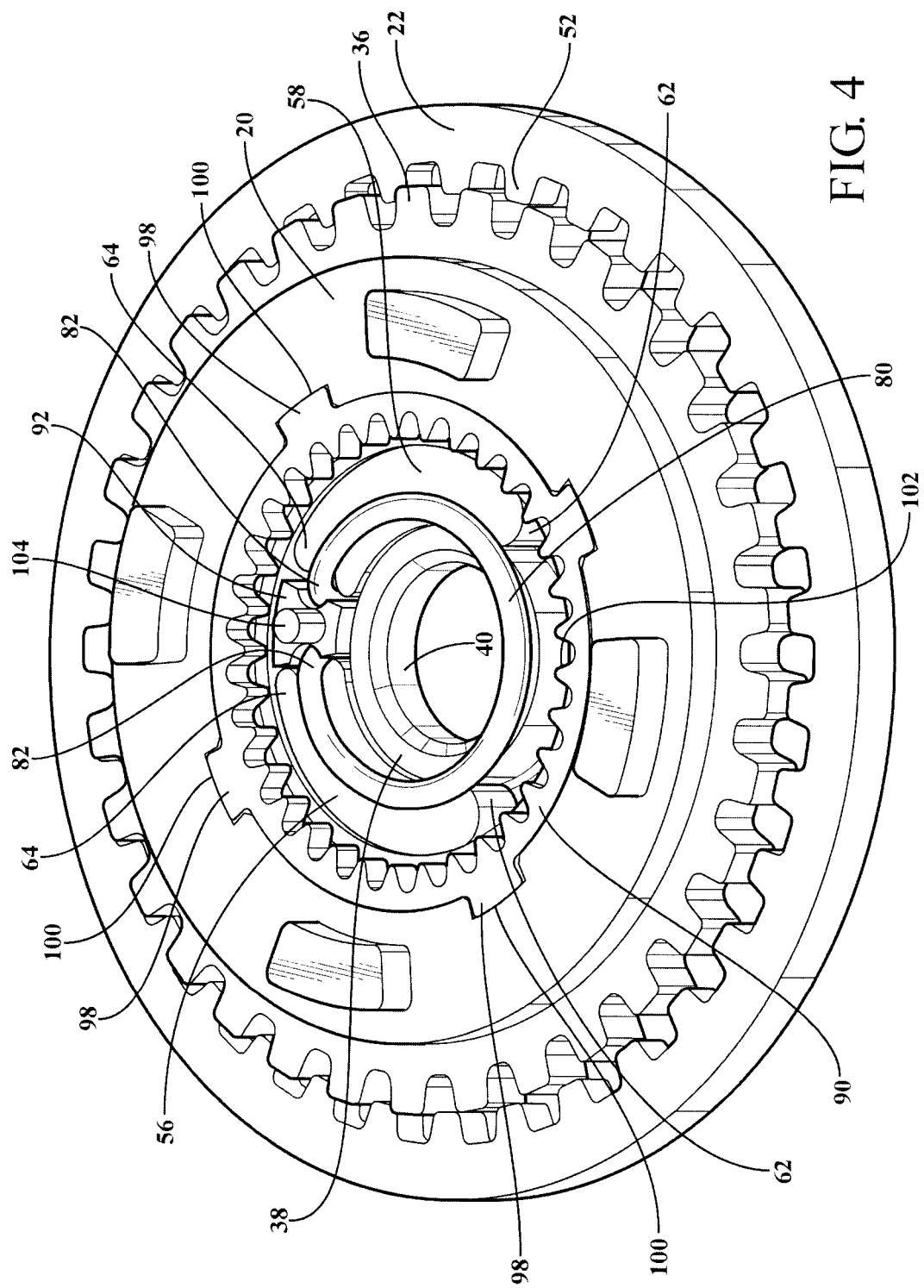
FIG. 4 is a perspective view of the continuous disc recliner with the cam and a portion of the anti-backdrive mechanism removed.

A drive mechanism is disposed between the movable plate 22 and the fixed plate 20 for urging the movable plate 22 to rotate relative to the fixed plate 20. The drive mechanism includes a cam 54 and a pair of wedges 56, 58 that are arranged in a mirror-image fashion. The wedges 56, 58 define an eccentric element 60. Each one of the wedges 56, 58 extends between a narrow end 62 and a wide end 64 and includes an inner side 66 and an outer side 68. The outer side 68 of each wedge 56, 58 rests against the first bearing surface 28 of the fixed plate 20 and the inner side 66 of each wedge 56, 58 rests against the second bearing surface 42 of the movable plate 22. The cam 54 includes a first ear 70, a second ear 72, and a drive segment 74. The drive segment 74 is disposed between the first bearing surface 28 and the second bearing surface 42, and extends in an arcuate fashion between the narrow ends 62 of the respective wedges 56, 58. The cam 54 also includes a central aperture 75 for receiving a drive shaft (not shown) to rotate the cam 54 in a first direction and a second direction. In FIG. 2, the cam 54 is shown in an initial position with the drive segment 74 spaced circumferentially apart from both of the wedges 56, 58.

Figure 5:
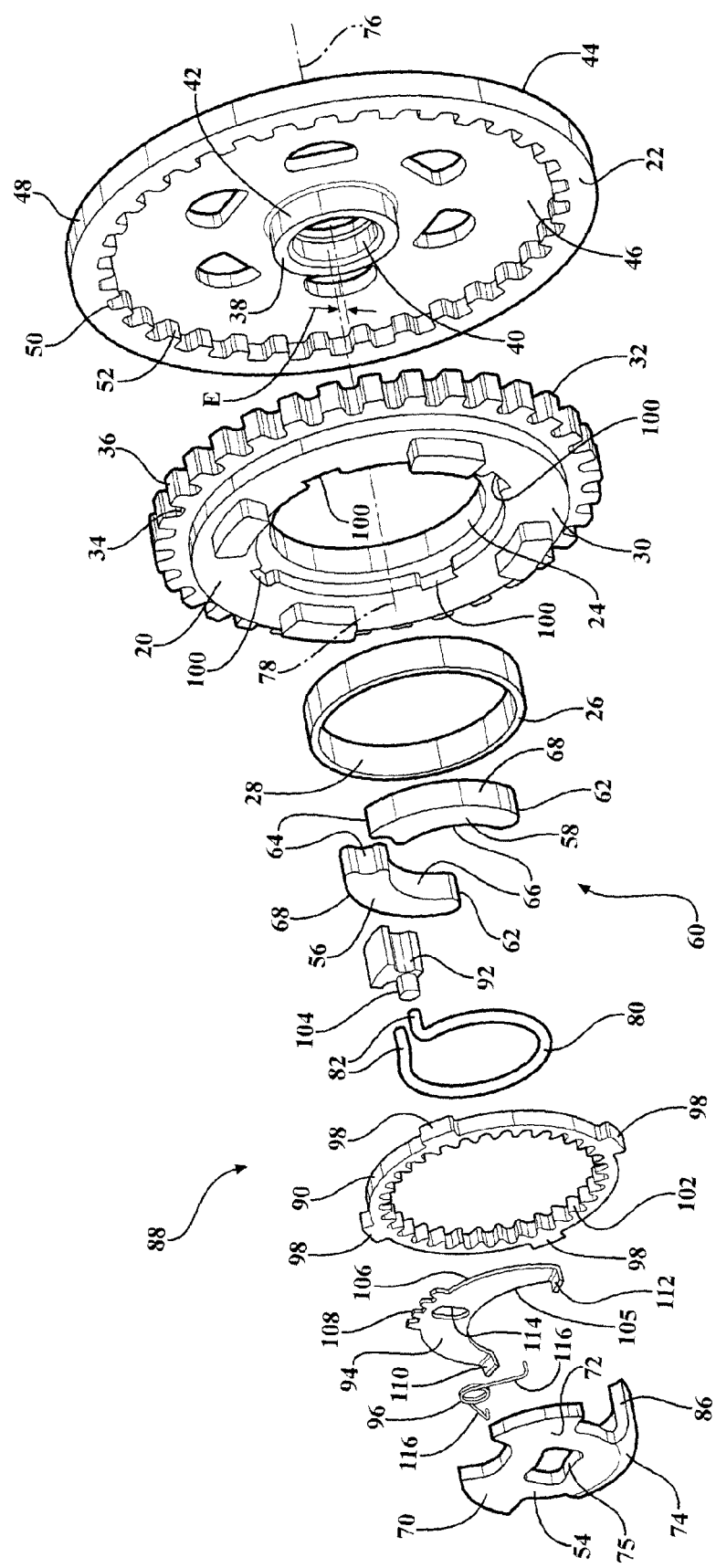
FIG. 5 is an exploded, first perspective view of the continuous disc recliner.
Figure 6:
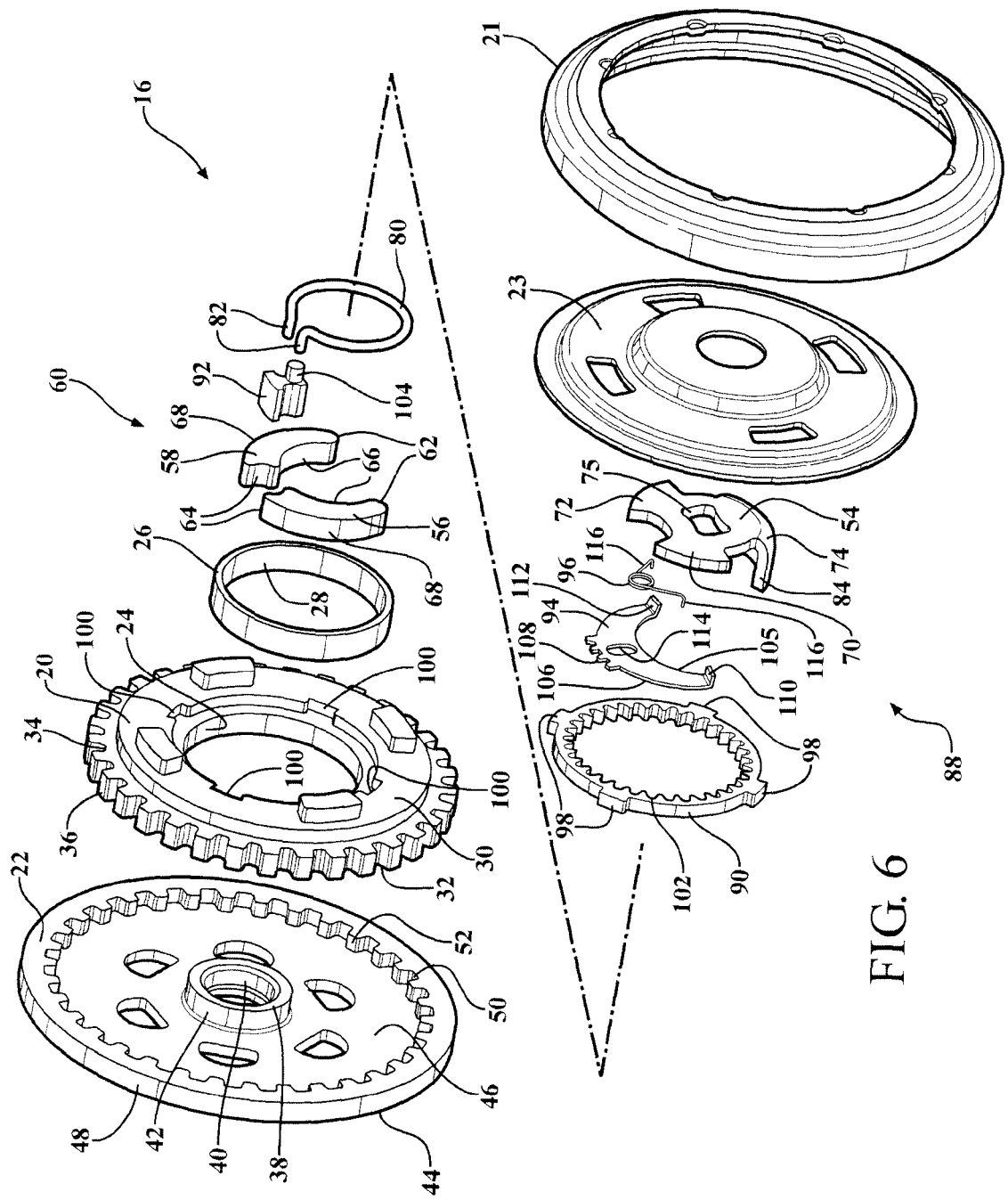
FIG. 6 is an exploded, second perspective view of the continuous disc recliner including a dust cover and retaining ring.
Figure 7:
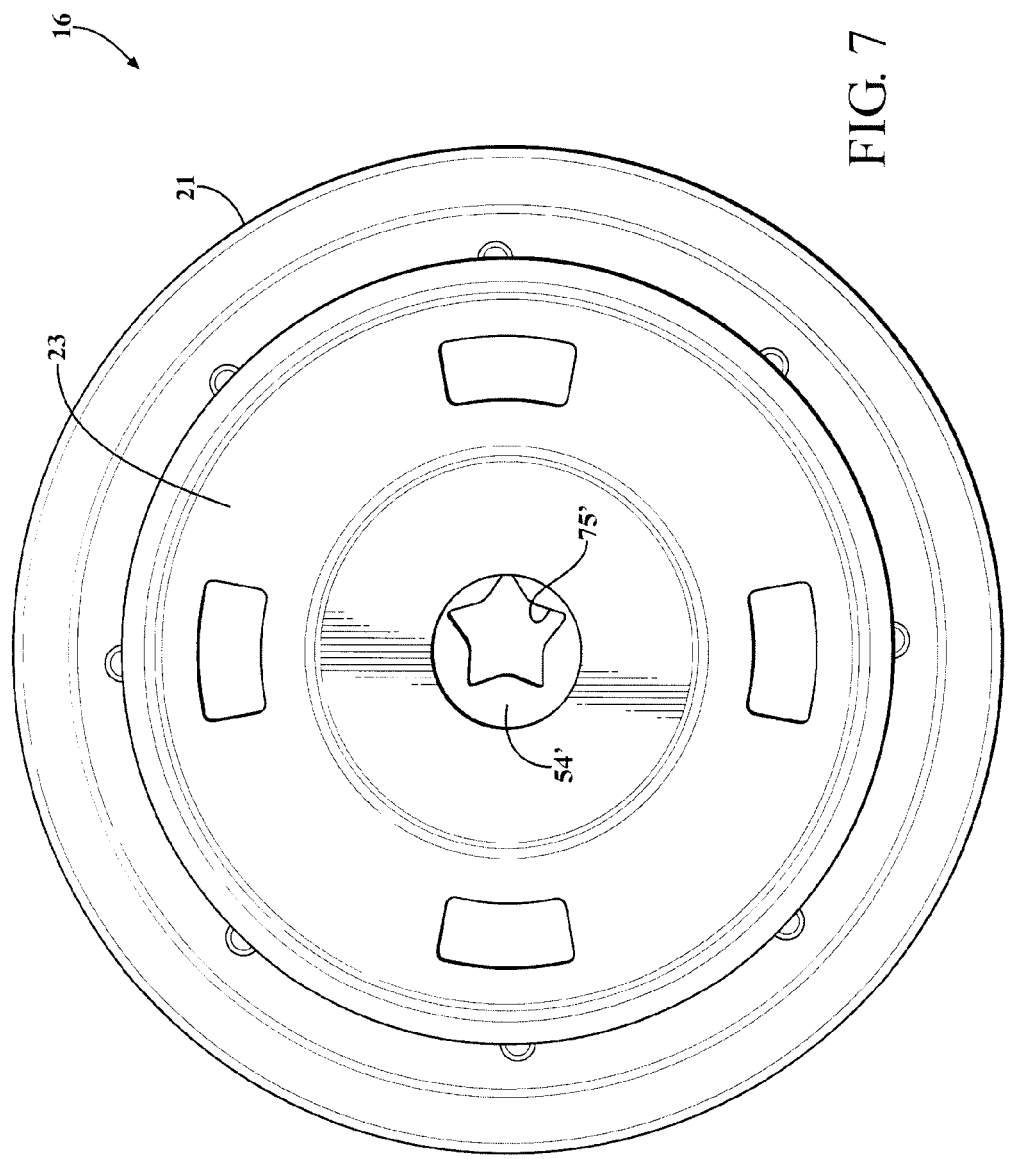
FIG. 7 is an end view of the continuous disc recliner.
Figure 8:
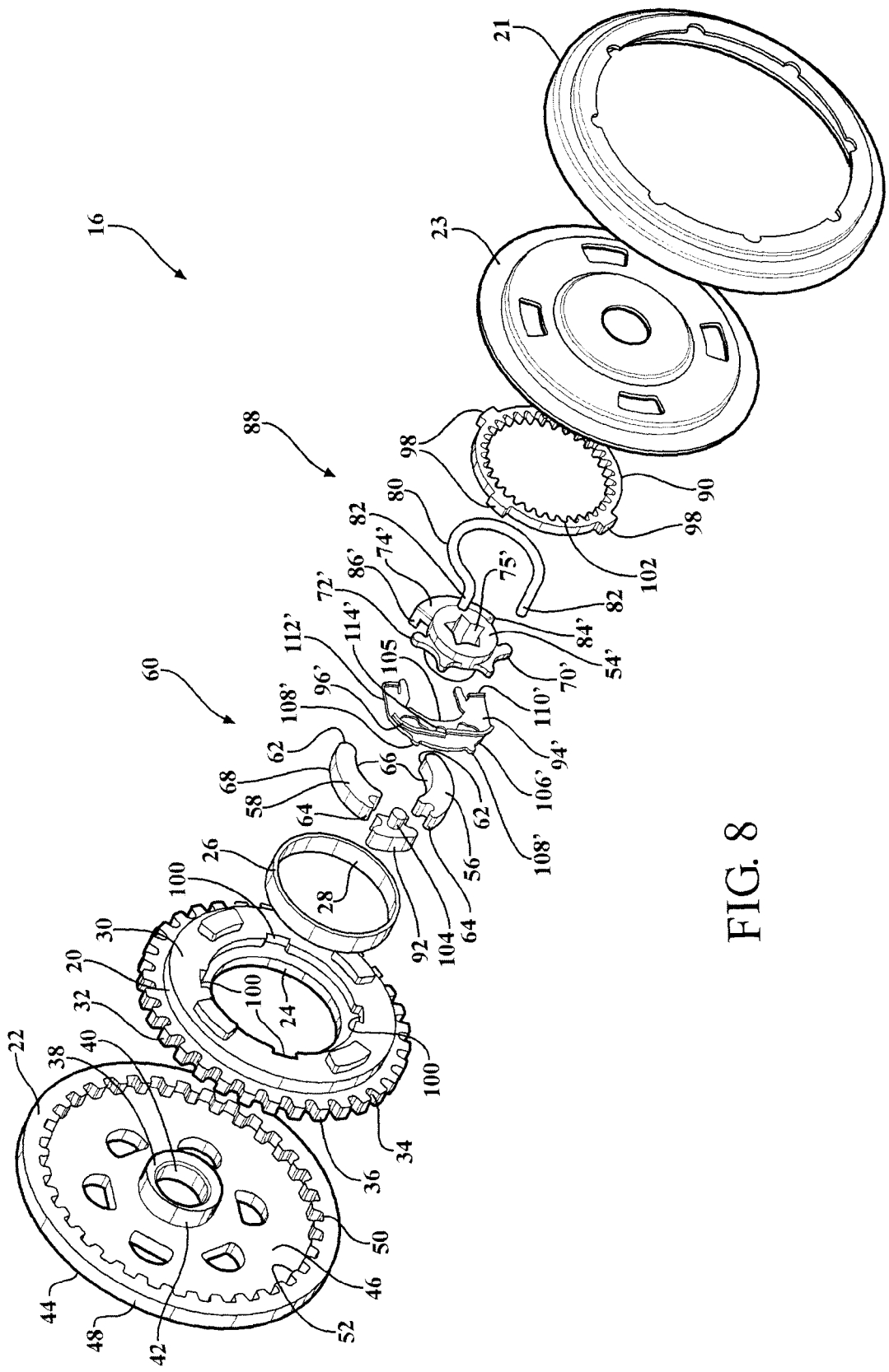
FIG. 8 is an exploded, perspective view of the continuous disc recliner having a anti-backdrive mechanism according to an alternative embodiment of the invention.
Figure 9:
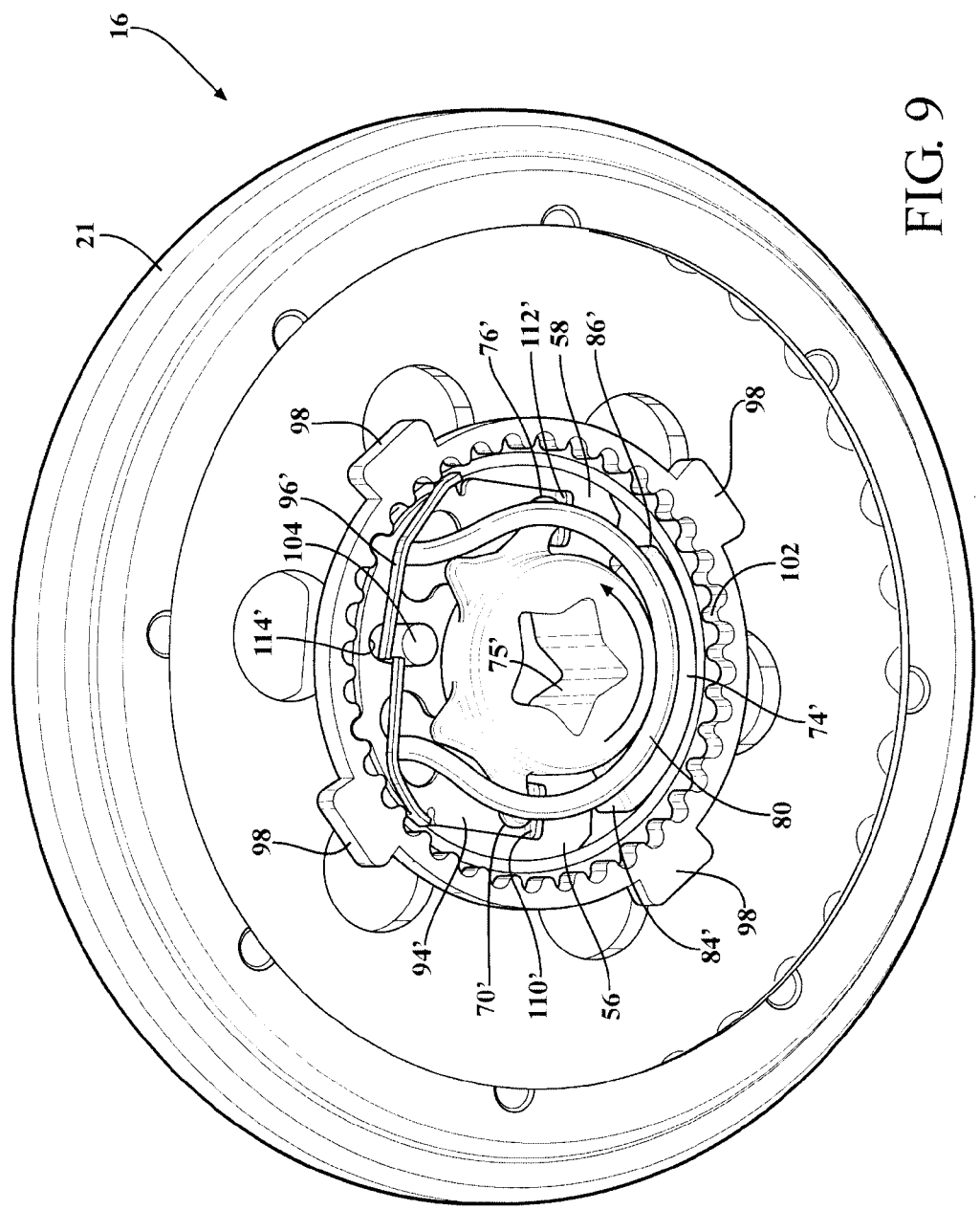
FIG. 9 is a perspective view of the continuous disc recliner of FIG. 8 with the dust cover removed.
Figure 10:
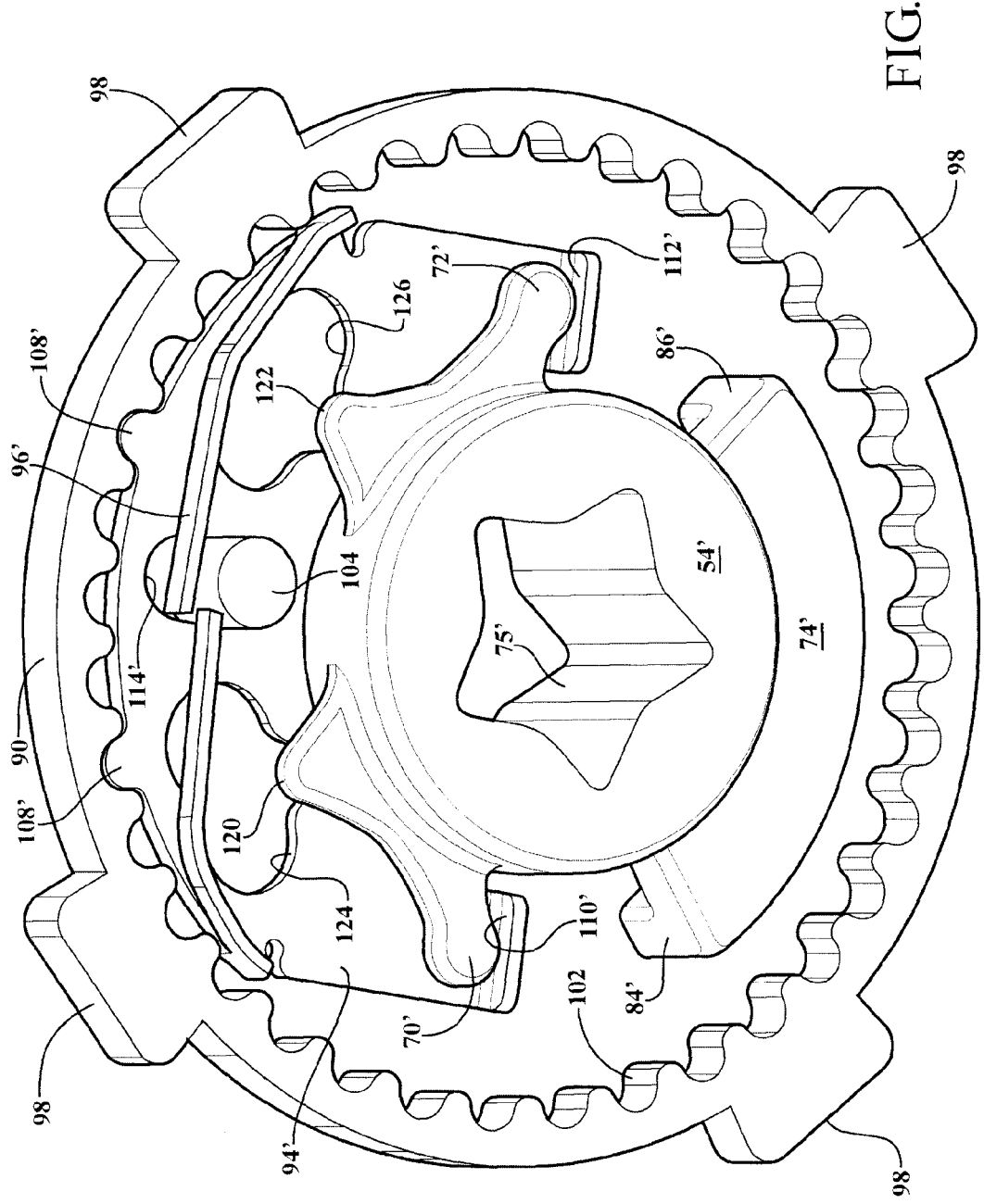
FIG. 10 is a perspective front view of the alternative anti-backdrive mechanism of FIG. 8.
Figure 11:
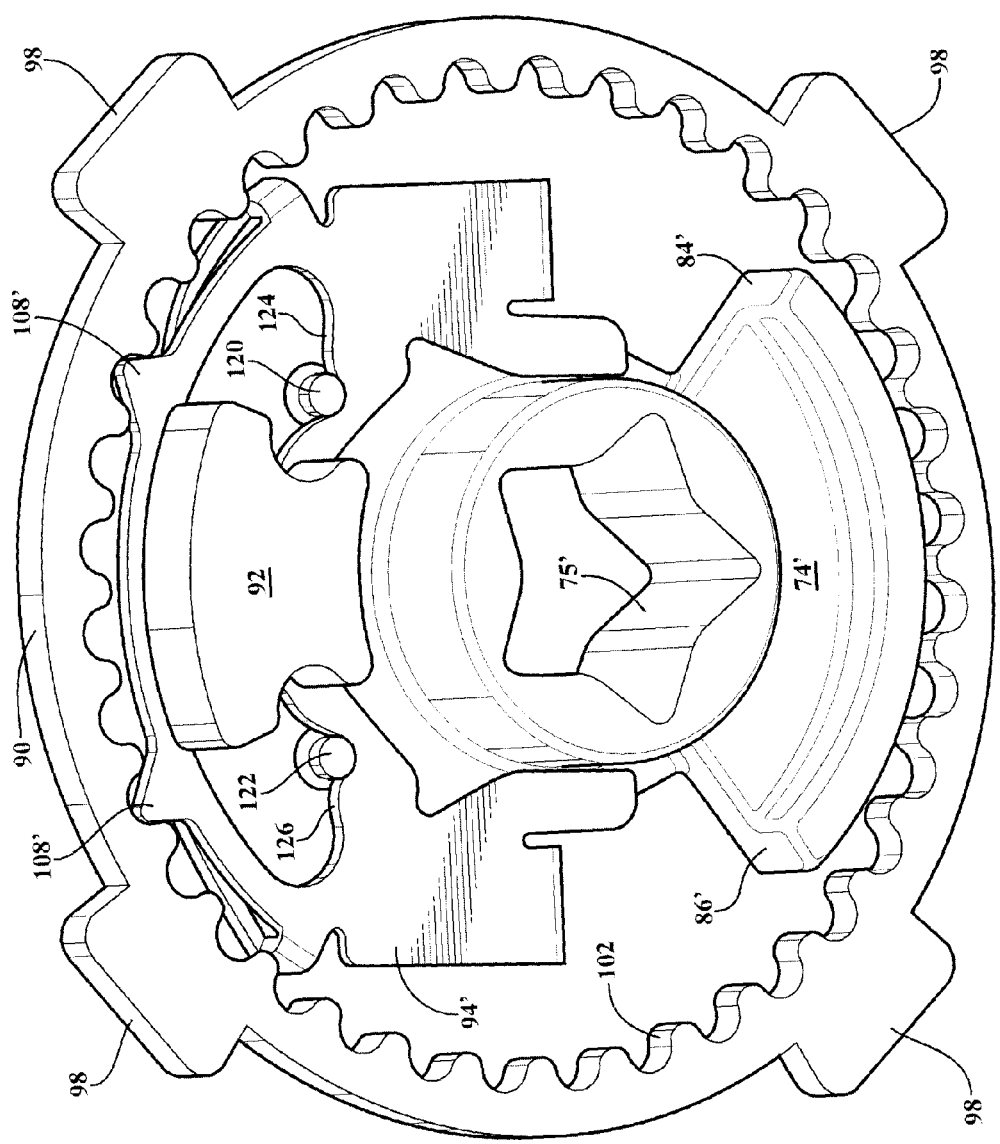
FIG. 11 is a perspective back view of the alternative anti-backdrive mechanism of FIG. 8.

Due to the insertion of the eccentric element 60 between the movable plate 22 and the fixed plate 20, an eccentricity E is created between a central axis 76 of the movable plate 22, which forms the pivoting axis of the disc recliner 16, and a central axis 78 of the fixed plate 20, as shown in FIG. 5. This eccentricity E presses the outer teeth 36 on the fixed plate 20 into the inner teeth 52 on the movable plate 22 at an engagement point in the direction defined by the eccentricity E.

In order to form the engagement between the first bearing surface 28, the wedges 56, 58, and the second bearing surface 42, without any play, the wedges 56, 58 are acted upon by a spring 80. The spring 80 includes two legs 82 bent at right angles that bear against the wide ends 68 of the wedges 56, 58, thereby forcing the wedges 56, 58 apart in a circumferential direction.

To adjust the disc recliner 16 to recline the seat back 14, the cam 54 is rotated from its initial position in the first direction. Rotating the cam 54 in the first direction causes a first end 84 of the drive segment 74 to engage the narrow end 62 of the wedge 56, which drives the wedge 56 in the first direction. Driving the wedge 56 in the first direction causes the other wedge 58 to also drive in the first direction because the spring 80 transfers movement from one wedge 56 to the other wedge 58. As the wedges 56, 58 are driven in the first direction they slide along the first bearing surface 28, shifting the direction of the eccentricity E and therefore shifting the engagement point of the outer teeth 36 on the fixed plate 20 and the inner teeth 52 on the movable plate 22. The shifting of the engagement point manifests itself as a wobbling rotational movement of the movable plate 22 in the first direction, thereby reclining the seat back 14.

Similarly, in order to adjust the disc recliner 16 to incline the seat back 14, the cam 54 is rotated from its initial position in the second direction. Rotating the cam 54 in the second direction causes a second end 86 of the drive segment 74 to engage the narrow end 62 of the wedge 58, which drives the wedge 58 in the second direction. Driving the wedge 58 in the second direction causes the other wedge 56 to also drive in the second direction because the spring 80 transfers movement from one wedge 58 to the other wedge 56. As the wedges 56, 58 are driven in the second direction they slide along the first bearing surface 28, shifting the direction of the eccentricity E and therefore shifting the engagement point of the outer teeth 36 on the fixed plate 20 and the inner teeth 52 on the movable plate 22. The shifting of the engagement point manifests itself as a wobbling rotational movement of the movable plate 22 in the second direction, thereby inclining the seat back 14.

Normally, friction between the wedges 56, 58 and the first 28 and second 42 bearing surfaces will maintain the seat back 14 in the selected reclined seating position. However, in some instances, such as when a large load is placed against the seat back 14 or due to vehicle vibrations, the seat back 14 will have a tendency to recline without any external input to the cam 54 by a seat occupant. Unwanted reclining of the seat back 14 is a result of the disc recliner 16 back-driving. Back-driving occurs when an external force on the seat back 14 overcomes the friction between the wedges 56, 58 and the first bearing surface 28, causing the wedges 56, 58 to slide in the first direction. As the wedges 56, 58 slide along the first bearing surface 28 in the first direction, the direction of the eccentricity E shifts, which shifts the engagement point of the outer teeth 36 and the inner teeth 52, thus allowing the seat back 14 to recline.

To prevent back-driving, the disc recliner 16 of the current invention includes an anti-backdrive mechanism, generally shown at 88. The anti-backdrive mechanism 88 includes a lock ring 90, a lock anchor 92, a lock plate 94, and a lock spring 96. The lock ring 90 is fixedly secured to the fixed plate 20. More specifically, the lock ring 90 is generally ring-shaped and includes four tabs 98 that protrude radially outward and engage four corresponding recesses 100 in the fixed plate 20, thereby fixedly securing the lock ring 90 and the fixed plate 20 together. It is appreciated, however, that the lock ring 90 may be integrally formed with the fixed plate 20 without varying from the scope of the invention. The lock ring 90 also includes a plurality of secondary inner teeth 102 disposed therearound. The lock anchor 92 is disposed between the first bearing surface 28 and the second bearing surface 42, and is located between the wide ends 64 of the respective wedges 56, 58. The lock anchor 92 includes an axially protruding post 104, the reason for which is set forth below. The lock plate 94 is arcuate and includes an inner peripheral edge 105 and an outer peripheral edge 106 having a toothed segment 108. The lock plate 94 extends between a first end flange 110 and a second end flange 112. The lock plate 94 also includes a slot 114 for slidably receiving the post 104 on the lock anchor 94. The toothed segment 108 on the outer peripheral edge 106 of the lock plate 94 is adapted for engagement with the secondary inner teeth 102 of the lock ring 90. The lock plate 94 moves linearly in the radial direction between a locked position and an unlocked position. In the locked position, the toothed segment 108 is engaged with the secondary inner teeth 102 of the lock ring 90. When the lock plate 94 is in the locked position, the lock plate 94 is secured to the fixed plate 20, which blocks the lock anchor 92 from being able to move relative to the fixed plate 20 thereby preventing movement of the wedges 56, 58 to stop back-driving of the disc recliner 16. In the unlocked position, the toothed segment 108 is disengaged with the secondary inner teeth 102 of the lock ring 90. When the lock plate 94 is in the unlocked position, the lock plate 94 is spaced apart from the fixed plate 20, which allows the lock anchor 92 to move in the circumferential direction relative to the fixed plate 20 thereby permitting movement of the wedges 56, 58 to allow adjustment of the disc recliner 16. The lock plate 94 is biased toward the locked position by the lock spring 96. The lock spring 96 is disposed about the post 104 on the lock anchor 92 and includes a pair of arms 116 engaging the inner peripheral edge 105 of the lock plate 94 to bias the lock plate 94 into the locked position.

The lock plate 94 is actuated to the unlocked position by rotating the cam 54 in the first and second directions. Rotating the cam 54 in the first direction causes the second ear 72 of the cam 54 to engage the second end flange 112 of the lock plate 94, which causes the lock plate 94 to move linearly inward to the unlocked position such that the toothed segment 108 is disengaged with the secondary inner teeth 102 of the lock ring 90. Similarly, rotating the cam 54 in the second direction causes the first ear 70 of the cam 54 to engage the first end flange 110 of the lock plate 94, which causes the lock plate 94 to move linearly inward to the unlocked position such that the toothed segment 108 is disengaged with the secondary inner teeth 102 of the lock ring 90.

Referring to FIGS. 8-11, an alternative embodiment of the anti-backdrive mechanism 88 is shown. More specifically, the alternative embodiment of the anti-backdrive mechanism 88 includes an alternative cam 54' and lock plate 94'. The cam 54' includes a first ear 70', second ear 72', and drive segment 74'. The drive segment 74' is disposed between the first bearing surface 28 and the second bearing surface 42, and extends in an arcuate fashion between the narrow ends 62 of the respective wedges 56, 58. The drive segment 74' includes a first end 84'to engage the narrow end 62 of the wedge 56 to drive the wedge 56 in the first direction and a second end 86' to engage the narrow end 62 of the wedge 58 to drive the wedge 58 in the second direction. The cam 54' includes a star shaped central aperture 75' for receiving a drive shaft (not shown) to rotate the cam 54' in the first and second directions. The cam 54' also includes spaced apart first and second guide pins 120, 122 for further engaging and guiding the lock plate 94' as will be further described below.

The lock plate 94' is generally U-shaped and includes an inner peripheral edge 105' and an outer peripheral edge 106'. A pair of spaced apart teeth 108' project outwardly from the outer peripheral edge 106' for locking engagement with the teeth 102 on the lock ring 90. The lock plate 94' extends between a first end flange 110' and a second end flange 112'. The lock plate 94' includes a center slot 114' for slidably receiving the post 104 on the lock anchor 94. The lock plate 94' also includes a pair of spaced apart guide windows 124, 126 for receiving the respective guide pins 120, 122 on the cam 54'. The lock spring 96' is integrally formed with the lock plate 94' extending laterally across the lock plate 94' and between the teeth 108' and the center slot 114' for engaging the post 104 on the lock anchor 92 and biasing the lock plate 94' into the locked position.

In the locked position, the teeth 108' are engaged with the secondary inner teeth 102 on the lock ring 90. When the lock plate 94' is in the locked position, the lock plate 94' is secured to the fixed plate 20, which blocks the lock anchor 92 from being able to move relative to the fixed plate 20 thereby preventing movement of the wedges 56, 58 to stop back driving of the disc recliner 16. In the unlocked position, the teeth 108' are disengaged from the secondary inner teeth 102 of the lock ring 90. When the lock plate 94' is in the unlocked position, the lock plate 94' is spaced apart from the fixed plate 20, which allows the lock anchor 92 to move in the circumferential direction relative to the fixed plate 20 thereby permitting movement of the wedges 56, 58 to allow adjustment of the disc recliner 16. The lock plate 94' is actuated from the locked to unlocked position by rotating the cam 54' in the first and second directions. Rotation the cam 54' in the first direction causes the second ear 72' of the cam 54' to engage the second end flange 112' of the lock plate 94', which causes the lock plate 94' to move linearly inward to the unlocked position. The guide pin 122 is also engaged with the guide window 126 to guide the lock plate 94' to the unlocked position. Similarly, rotating the cam 54' in the second direction causes the first ear 70' of the cam 54' to engage the first end flange 110' of the lock plate 94', which causes the lock plate 94' to move linearly inward to the unlocked position. The guide pin 120 is similarly engaged with the guide window 124 to guide the lock plate 94' to the unlocked position. The lock spring 96' is engaged with the post 104 to bias and return the lock plate 94' to the locked position.

In operation, beginning with the seat back 14 in one of the plurality of reclined seating positions and the lock plate 94, 94' in the locked position, a seat occupant can actuate the drive shaft in the first direction to recline the seat back 14. Actuating the drive shaft in the first direction causes the cam 54, 54' to rotate in the first direction. Rotating the cam 54, 54' in the first direction causes the second ear 72, 72' of the cam 54, 54' to engage the second end flange 112, 112' of the lock plate 94, 94', which causes the lock plate 94, 94' to move linearly inward to the unlocked position such that the toothed segment 108, 108' is disengaged with the secondary inner teeth 102 of the lock ring 90. With the lock plate 94, 94' in the unlocked position, the lock anchor 92 is free to move in the circumferential direction relative to the fixed plate 20 and continued rotation of the cam 54, 54' in the first direction causes the first end 84, 84' of the drive segment 74, 74 to engage the narrow end 62 of the wedge 56 to drive the wedge 56 in the first direction. Driving the wedge 56 in the first direction causes the other wedge 58 to also drive in the first direction because the spring 80 transfers movement from one wedge 56 to the other wedge 58. As the wedges 56, 58 are driven in the first direction they slide along the first bearing surface 28, shifting the direction of the eccentricity E and shifting the engagement point of the outer teeth 36 and the inner teeth 52. As previously stated, the shifting of the engagement point manifests itself as a wobbling rotational movement of the movable plate 22 in the first direction, thereby reclining the seat back 14. Once the desired reclined seating position is selected, the seat occupant stops actuating the drive shaft and the cam 54, 54' is allowed to return to its initial position. With the cam 54, 54' in its initial position, the lock plate 94, 94' moves linearly outward under the bias of the lock spring 96, 96' to the locked position such that the toothed segment 108, 108' is engaged with the secondary inner teeth 102 of the lock ring 90 in order to prevent back-driving.

Similarly, actuating the drive shaft in the second direction causes the cam 54, 54' to rotate in the second direction. Rotating the cam 54, 54' in the second direction causes the first ear 70, 70' of the cam 54, 54' to engage the first end flange 110, 110' of the lock plate 94, 94', which causes the lock plate 94, 94' to move linearly inward to the unlocked position such that the toothed segment 108, 108' is disengaged with the secondary inner teeth 102 of the lock ring 90. With the lock plate 94, 94' in the unlocked position, the lock anchor 92 is free to move in the circumferential direction relative to the fixed plate 20 and continued rotation of the cam 54, 54' in the second direction causes the second end 86, 86' of the drive segment 74, 74' to engage the narrow end 62 of the wedge 58 to drive the wedge 58 in the second direction. Driving the wedge 58 in the second direction causes the other wedge 56 to also drive in the second direction because the spring 80 transfers movement from one wedge 58 to the other wedge 56. As the wedges 56, 58 are driven in the second direction they slide along the first bearing surface 28, shifting the direction of the eccentricity E and shifting the engagement point of the outer teeth 36 and the inner teeth 52. As previously stated, the shifting of the engagement point manifests itself as a wobbling rotational movement of the movable plate 22 in the second direction, thereby inclining the seat back 14. Once the desired reclined seating position is selected, the seat occupant stops actuating the drive shaft and the cam 54, 54' is allowed to return to its initial position. With the cam 54, 54' in its initial position, the lock plate 94, 94' moves linearly outward under the bias of the lock spring 96, 96' to the locked position such that the toothed segment 108, 108' is engaged with the secondary inner teeth 102 of the lock ring 90 in order to prevent back-driving.

The invention has been described here in an illustrative manner, and it is to be understood that the terminology used is intended to be in the nature of words of description rather than limitation. Many modifications and variations of the present invention are possible in light of the above teachings. It is, therefore, to be understood that within the scope of the appended claims, the invention may be practiced other than as specifically enumerated within the description.

What is claimed:

1. A disc recliner for a vehicle seat, said disc recliner comprising:
   a fixed plate including a plurality of outer teeth;
   a movable plate including a plurality of inner teeth meshingly engageable with said plurality of outer teeth on said fixed plate to allow rolling movement of said movable plate relative to said fixed plate;
   a pair of wedges rotatably mounted between said fixed and movable plates, wherein said pair of wedges define an eccentric and rotation of said pair of wedges causes said rolling movement of said movable plate relative to said fixed plate;
   a lock anchor disposed between said pair of wedges for rotation therewith;
   a lock plate coupled to said lock anchor and movable between a locked position engaged with said fixed plate to block movement of said lock anchor thereby preventing rotation of said pair of wedges and an unlocked position disengaged with said fixed plate to allow movement of said lock anchor thereby permitting rotation of said pair of wedges;
   a lock spring operatively coupled between said lock plate and said lock anchor for biasing said lock plate to said locked position; and
   a cam for rotatably driving said pair of wedges and actuating said lock plate between said locked and unlocked positions, wherein rotation of said cam actuates said lock plate from said locked position to said unlocked position and rotates said pair of wedges thereby causing said rolling movement of said movable plate relative to said fixed plate.

2. A disc recliner as set forth in claim 1 further including a lock ring fixedly secured to said fixed plate and having a plurality of inner teeth and wherein said lock plate includes a plurality of outer teeth for meshed engagement with said inner teeth of said lock ring in said locked position to prevent rotation of said wedges and rolling movement of said movable plate relative to said fixed plate.

3. A disc recliner as set forth in claim 2 wherein said lock anchor includes an outwardly projecting post and said lock plate includes an elongated slot for receiving said post to slidably guide said lock plate between said locked and unlocked positions.

4. A disc recliner as set forth in claim 3 wherein each of said pair of wedges include a first end positioned on opposing sides of said lock anchor and an opposite second distal end.

5. A disc recliner as set forth in claim 4 wherein said cam includes a drive segment positioned between said second distal ends of said wedges for selectively engaging one of said second distal ends and rotatably driving said pair of wedges in a first direction and an opposite second direction.

6. A disc recliner as set forth in claim 5 wherein said lock plate includes a pair of spaced apart first and second end flanges positioned adjacent said second distal ends of said respective pair of wedges and said cam includes a pair of spaced apart outwardly projecting first and second ears for engaging said respective first and second end flanges upon rotation of said cam in one of said first and second direction for actuating said lock plate between said locked and unlocked positions.

7. A disc recliner as set forth in claim 6 wherein said cam includes a central aperture for receiving a drive shaft to rotate said cam in each of said first and second directions.

8. A disc recliner as set forth in claim 7 wherein said pair of wedges includes a first wedge and a second wedge and further including a spring having a first end seated between said lock anchor and said first end of said first wedge and a second end seated between said lock anchor and said first end of said second wedge for transferring rotation of one of said wedges upon rotation of said cam in said first direction and second directions to rotation of said other one of said wedges.

9. A disc recliner as set forth in claim 8 wherein said drive segment of said lock plate includes a first drive end for engaging and rotatably driving said second distal end of one of said wedges upon rotation of said cam in said first direction and a second drive end for engaging and rotatably driving said second distal end of the other one of said wedges upon rotation of said cam in said second direction.

10. A disc recliner as set forth in claim 9 wherein said fixed plate includes a center bore defining a first bearing surface and said movable plate includes a center bore circumscribed by an integral collar defining a second bearing surface, said collar of said movable plate disposed within said center bore of said fixed plate.

11. A disc recliner as set forth in claim 10 wherein said pair of wedges and said lock anchor are seated between said first and second bearing surfaces and each of said wedges includes an inner side seating against said second bearing surface of said movable plate and an outer side seating against said first bearing surface of said fixed plate.

12. A disc recliner as set forth in claim 11 wherein said center bore of said movable plate defines a first central axis and said center bore of said fixed plate defines a second central axis offset from said first central axis.

13. A disc recliner as set forth in claim 12 wherein said fixed plate includes an outer circumferential surface formed by said plurality of outer teeth for rolling meshed engagement with an inner circumference formed by said plurality of inner teeth on said movable plate thereby allowing rolling movement of said movable plate relative to said fixed plate.

14. A disc recliner as set forth in claim 13 wherein said lock plate includes a pair of guide windows along opposing sides of said elongated slot and said cam includes a pair of spaced apart outwardly projecting guide pins received in said respective guide windows for guiding said lock plate along a linear path defined by said elongated slot between said locked and unlocked positions.

* * * * *